United States Patent
Li et al.

(10) Patent No.: US 9,639,849 B2
(45) Date of Patent: *May 2, 2017

(54) ALLOCATING COMMODITY SHELVES IN A SUPERMARKET

(71) Applicant: International Business Machine Corporation, Armonk, NY (US)

(72) Inventors: Hong Bo Li, Beijing (CN); Wei Wang, Beijing (CN); Hong Wei Ding, Beijing (CN); Jin Dong, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 105 days.

This patent is subject to a terminal disclaimer.

(21) Appl. No.: 14/042,405

(22) Filed: Sep. 30, 2013

(65) Prior Publication Data

US 2014/0100916 A1    Apr. 10, 2014

Related U.S. Application Data

(63) Continuation of application No. 13/336,845, filed on Dec. 23, 2011, now Pat. No. 8,571,908.

(30) Foreign Application Priority Data

Dec. 30, 2010    (CN) .......................... 2010 1 0624751

(51) Int. Cl.
    *G06Q 30/02*    (2012.01)
(52) U.S. Cl.
    CPC ......... *G06Q 30/0202* (2013.01); *G06Q 30/02* (2013.01)
(58) Field of Classification Search
    CPC combination set(s) only.
    See application file for complete search history.

(56) References Cited

U.S. PATENT DOCUMENTS 7,734,495 B2    6/2010    Klaubauf et al.
7,786,857 B2    8/2010    Yuba et al.
(Continued)

FOREIGN PATENT DOCUMENTS

| CN | 101809600 A | 8/2010 |
| JP | 2002-149777 A | 5/2002 |
| JP | 2008-217074 A | 9/2008 |
| KR | 2007-0088953 A | 8/2007 |
| WO | WO 2006/102183 A2 | 9/2006 |

OTHER PUBLICATIONS

I-En Liao, et al., Shopping Path Analysis and Transaction Mining Based on RFID Technology, National Chung Hsing University, Taichuno, RFID Eurasia, 2007 1st Annual Oct. 2007.
(Continued)

*Primary Examiner* — Mark A Fleischer
(74) *Attorney, Agent, or Firm* — Kurt Goudy, Esq.; McGinn IP Law Group, PLLC

(57) ABSTRACT

A method of allocating shelves includes obtaining shopping paths of customers in a supermarket, classifying the plurality of customers into a plurality of customer classes based on the shopping paths of the plurality of customers, determining one or more shopping paths adopted by more customers in the plurality of customer classes as frequent shopping paths of a class of customers of the plurality of customer classes, calculating a see-buy rate of a commodity for each of the plurality of customer classes based on shopping lists and the frequent shopping paths of the plurality of customers, calculating a location for a set of commodities when total expected benefits for the set of commodities are maximized during a certain period of time. The total expected benefits include a sum of an expected benefit for each commodity in the set of commodities based on the see-buy rate and the frequent shopping paths.

9 Claims, 6 Drawing Sheets

(56) References Cited

U.S. PATENT DOCUMENTS

| | | | |
|---|---|---|---|
| 8,571,908 B2* | 10/2013 | Li et al. | 705/7.11 |
| 2003/0055707 A1* | 3/2003 | Busche | G06Q 30/02 705/14.65 |
| 2006/0010027 A1* | 1/2006 | Redman | G06Q 10/06311 705/7.16 |
| 2006/0010030 A1 | 1/2006 | Sorensen | |
| 2007/0239569 A1* | 10/2007 | Lucas | G06Q 10/08 705/28 |
| 2010/0161435 A1 | 6/2010 | Shimizu et al. | |

OTHER PUBLICATIONS

Tugba Yaman, et al., Clustering Grocery Shopping Paths of Customers by Using Optimization Based Models, $20^{th}$ EURO Mini Conference, May 20-23, 2008, Lithuania, pp. 439-443.

Jeffrey S. Larson, et al., An Exploratory Look at Supermarket Shopping Paths, Jul. 2004, pp. 1-30.

Andrew Lim, Brian Rodrigues, and Xingwen Zhang. "Metaheuristics with Local Search Techniques for Retail Shelf-Space Optimization," Management Science, vol. 50, No. 1, Jan. 2004, pp. 117-131.

Sam Hui, Eric T. Bradlow, Peter S. Fader. "Testing Behavioral Hypotheses Using an Integrated Model of Grocery Store Shopping Path and Purchase Behavior," Journal of Consumer Research, Inc., vol. 36 Issue 3, Oct. 2009, pp. 478-493.

\* cited by examiner

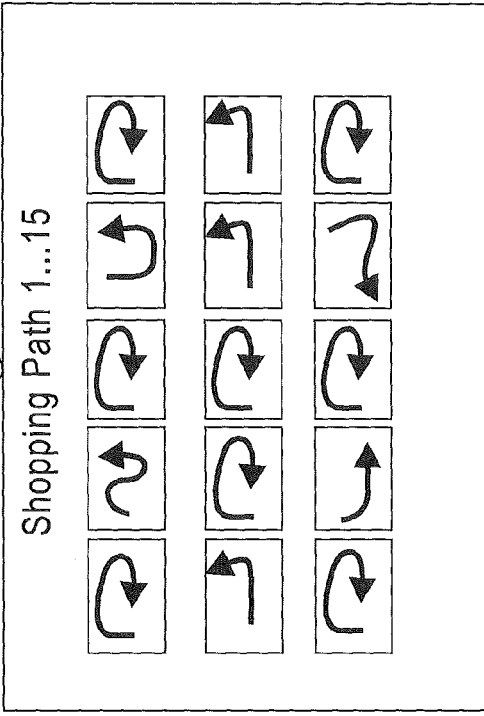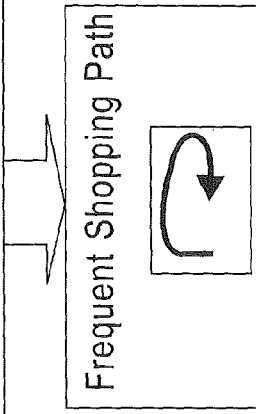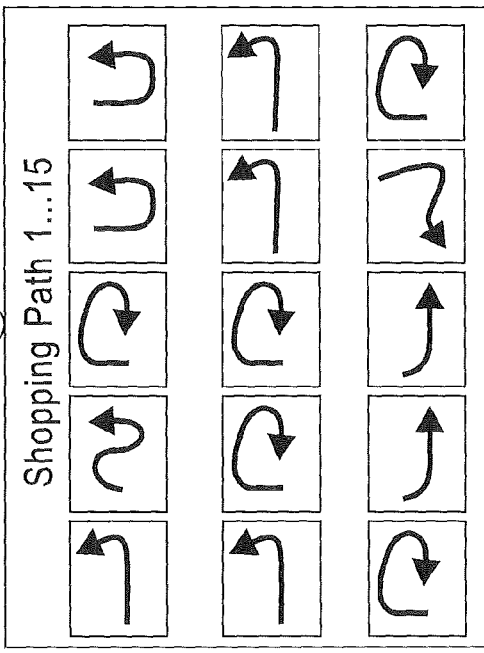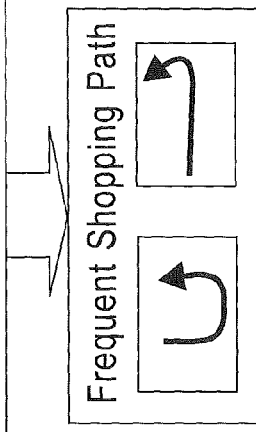
FIG. 4

| Commodity (i) | Shelf (j) |
|---|---|
| 1 | 22 |
| 2 | 15 |
| 3 | 7 |

ALLOCATING COMMODITY SHELVES IN A SUPERMARKET

CROSS-REFERENCE TO RELATED APPLICATION

The present application is a Continuation Application of U.S. patent application Ser. No. 13/336,845 filed on Dec. 23, 2011, which is based on Chinese Patent Application No. 2010-10624751.2, filed on Dec. 30, 2010, the entire contents of which is incorporated herein by reference.

FIELD OF THE INVENTION

The present disclosure relates to the technology of Internet of Things, and more particularly, to a technology supporting commodity shelf management in retail supermarkets.

BACKGROUND OF THE INVENTION

How to deploy commodities for sale in different shelves in a supermarket so as to provide convenience for customer purchase and arouse the desire of customers to purchase is quite important for both merchants and customers. Various technologies have been used to support commodity shelf management in the existing hypermarkets. For example, a staff for commodity shelf management usually records customer traffic situation in a supermarket through field observation (or monitoring cameras) and places popular commodities, promotion commodities, and important commodities at sites with greater customer traffic (for example near a cash register) or shelves in a promotion area, so as to achieve greater sales benefits. Conventional methods recommend placing associated commodities together and displaying commodities with greater benefits at areas with larger customer traffic. However, because of limitations on variety sectors in sale spaces of a supermarket, retailers generally display commodities by sector. In general, different kinds of commodities cannot be placed together. Moreover, different customer groups feel interested in different commodities, thus placing all the associated commodities together does not take into account the differences in customer groups.

SUMMARY OF THE INVENTION

The present invention aims at providing an improved method of supporting commodity shelf management in a supermarket.

According to one aspect, there is provided a method of allocating commodity shelves in a supermarket, comprising:
obtaining shopping paths of customers in a supermarket;
classifying customers according to a predetermined standard;
based on the shopping paths of customers, determining one or more shopping paths adopted by more customers in each class of customers as frequent shopping path(s) of this class of customers;
based on shopping lists and the shopping paths of customers, calculating a see-buy rate of a commodity for each class of customers, wherein the see-buy rate of a commodity for a class of customers refers to a probability to purchase this commodity for this class of customers when they see this commodity;
for a set of commodities, calculating a shelf where each commodity in the set of commodities is located when the total expected benefits for set of commodities are maximized during a certain period of time, wherein the total expected benefits include a sum of an expected benefit for the each commodity based on the see-buy rate and the frequency shopping path when the each commodity is located in its own shelf.

According to another aspect, there is provided a system for allocating commodity shelves in a supermarket, comprising:
shopping path obtaining means for obtaining shopping paths of customers in a supermarket;
classifying means for classifying the customers according to a predetermined standard;
frequent shopping path determining means for determining one or more shopping paths adopted by more customers in each class of customers as frequent shopping path(s) of this class of customers based on the shopping paths of customers;
see-buy rate calculating means for calculating a see-buy rate of a commodity for each class of customers based on shopping lists and the shopping paths of customers, wherein the see-buy rate of a commodity for a class of customers refers to a probability to purchase this commodity for this class of customers when they see the commodity;
commodity shelf determining means, which, for a set of commodities, calculates a shelf where each commodity in the set of commodities is located when the total expected benefits for set of commodities are maximized during a certain period of time, wherein the total expected benefits include a sum of an expected benefit for the each commodity based on the see-buy rate and the frequency shopping path when the each commodity is located in its own shelf.

By using the embodiments of the present invention, placement locations for one or more commodities may be determined systematically upon promotion, display change, or a new commodity on-shelf.

BRIEF DESCRIPTION OF THE DRAWINGS

Inventive features that are regarded as the characteristics of the present invention are set forth in the Summary of the Invention section and the appended claims. However, the present invention, its implementation mode, other objectives, features and advantages will be better understood from the following detailed description of the exemplary embodiments, when taken in conjunction with the accompanying drawings, wherein:

FIG. 4 schematically illustrates a method of determining a frequent shopping path for each class of customers according to embodiments of the present invention;

DETAILED DESCRIPTION OF THE PREFERRED EMBODIMENTS

Hereinafter, embodiments of the present invention will be described with reference to the accompanying drawings. In the following description, many specific details are illustrated so as to understand the present invention more comprehensively. However, it is apparent to the skilled in the art that implementation of the present invention may not have these details. Additionally, it should be understood that the present invention is not limited to the particular embodiments as introduced here. On the contrary, any arbitrary combination of the following features and elements may be considered to implement and practice the present invention, regardless of whether they involve different embodiments. Thus, the following aspects, features, embodiments and advantages are only for illustrative purposes and should not be understood as elements or limitations of the appended claims, unless otherwise explicitly specified in the claims.

FIGS. 1A and 1B schematically illustrate an environment in which methods and systems according to embodiments of the present invention may be implemented, wherein FIG. 1A illustrates a scenario where customers are shopping in a supermarket.

As illustrated in FIGS. 1A and 1B, shelves (7, 15, 22) for placing commodities for sale are deployed in different locations in a sale sector of a supermarket 100. A customer 110 with a shopping cart 120 wanders in the supermarket 100, and when seeing a commodity he/she is intended to buy, takes the commodity off from the shelf, and puts it in the shopping cart 120. Finally, at an exit of the supermarket, a salesperson checks the commodities in the shopping cart of the customer and inputs data to a POS machine (not illustrated). The POS machine generates a shopping list recording names, amounts, and other information of the commodities and shows the shopping list and payable amount to the customer; then the customer checks out and takes the commodities in the shopping cart away.

Figure 2:
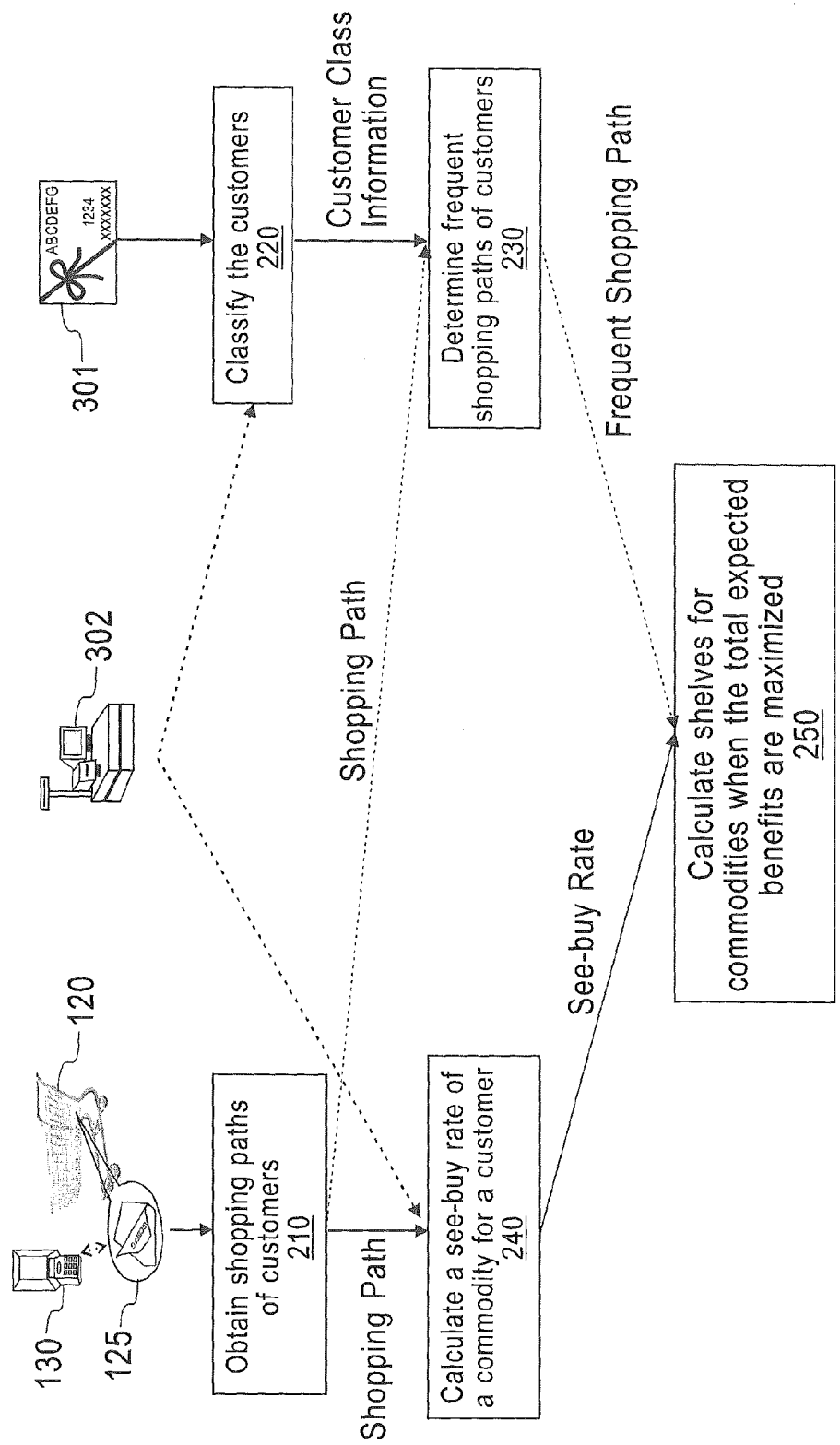
FIG. 2 schematically illustrates a flow chart of a method according to embodiments of the present invention.

FIG. 2 illustrates a flow chart of a method according to embodiments of the present invention. This flow chart comprises steps 210, 220, 230, 240, and 250. Hereinafter, these steps will be described in detail in combination with other figures.

At step 210, shopping paths of customers in a supermarket are obtained. A shopping path of a customer refers to a traveling line of the customer in a sale sector of a supermarket.

According to one embodiment of the present invention, data on shopping paths of customers may be obtained by tracking shopping carts of the customers. Referring to FIGS. 1A and 1B, in one embodiment, an RFID tag 125 is installed on a shopping cart 120 or on a shopping basket; on the other hand, RFID readers 130 are deployed at different locations (L3, L4, L5, L6, L9, L10, L11, L12) in the sale sector. When the shopping cart (or shopping basket) moves in the supermarket along with the customer, the RFID reader 130 may detect the RFID tag 125 on the shopping cart, thereby detecting that the corresponding shopping cart passes through this location. For example, as illustrated in FIG. 1B, when the RFID reader deployed at location L5 detects an RFID on a shopping cart, it is deemed that this shopping cart passes this location L5 during the movement process.

Figure 1:
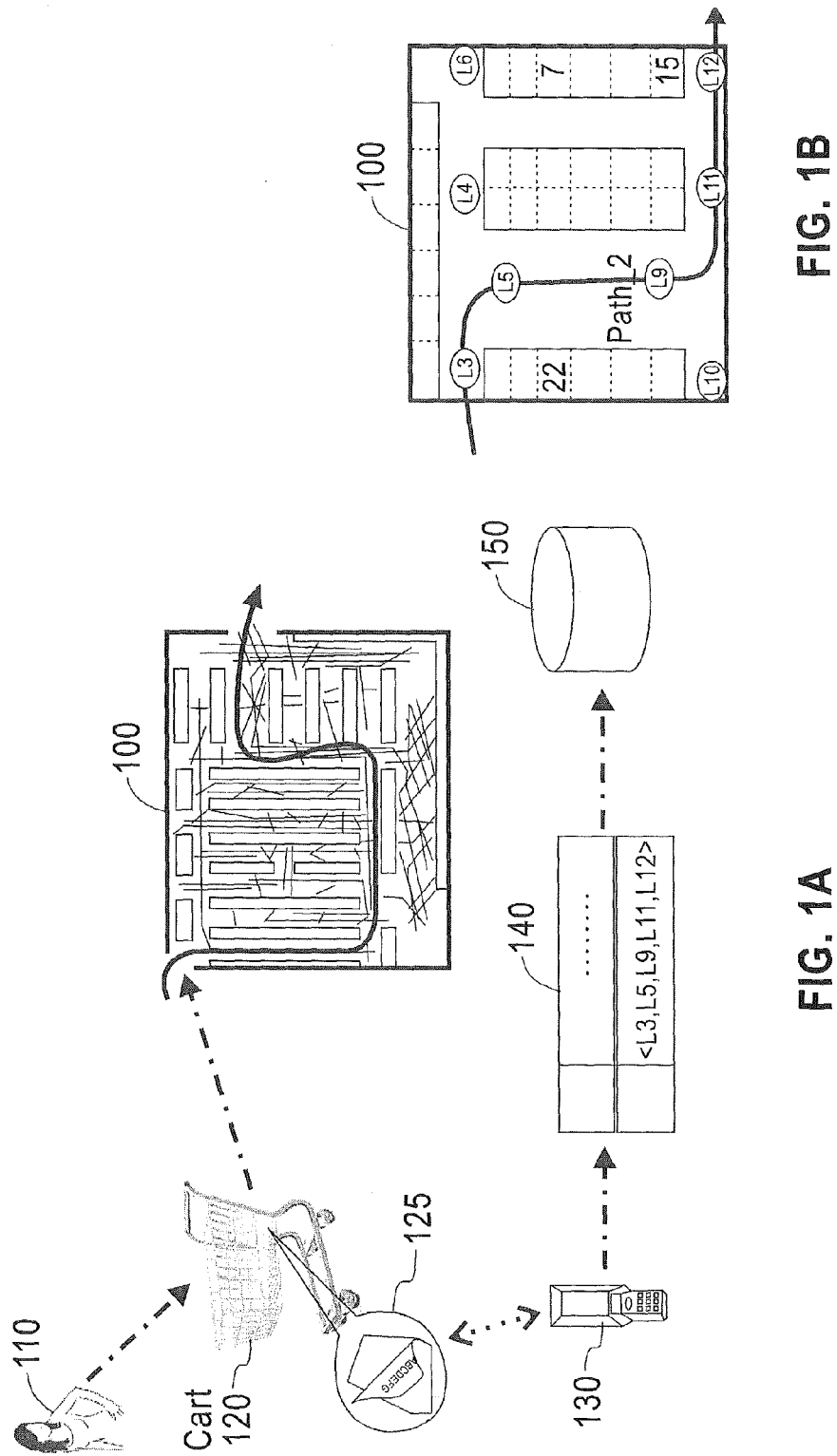
FIGS. 1A and 1B schematically illustrate an environment in which methods and systems according to embodiments of the present invention may be implemented.

The RFID reader 130 deployed at different locations in the supermarket may detect different locations passed by a same shopping cart. A location sequence obtained by arranging different locations passed by the same shopping cart can represent the shopping path of the customer. For example, the shopping path Path_A_2 as illustrated in FIG. 1 may be represented by a location sequence 140 (for example <L3, L5, L9, L11, L12>). This shopping path may be stored in a database 150 in an associated manner with the customer. The methods and systems according to the present invention may access the database through a computer (not illustrated) so as to read and write data.

Figure 3:
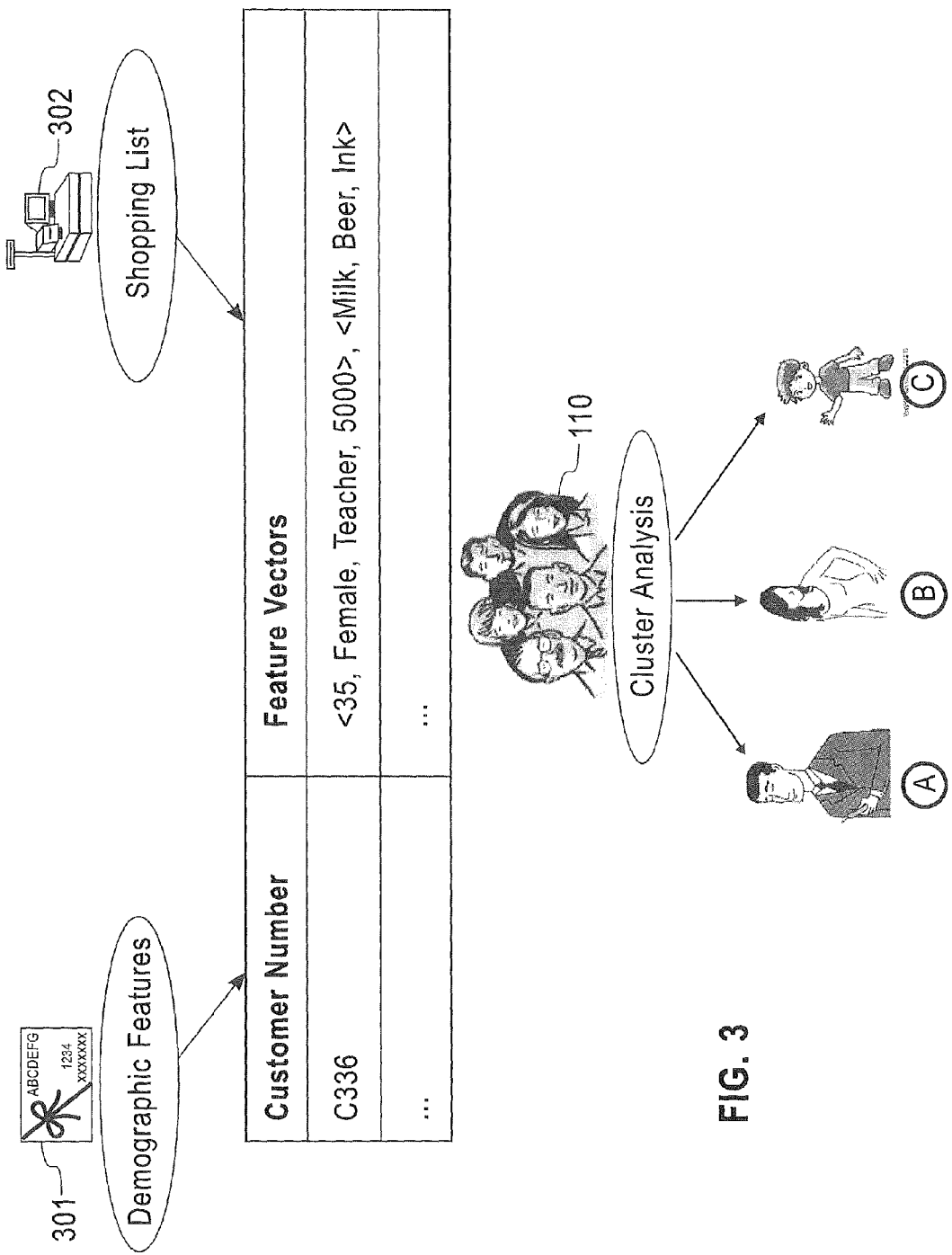
FIG. 3 schematically illustrates classifying customers.

At step 220, the customers are classified according to a predetermined standard;

Step 220 may be implemented as illustrated in the example of FIG. 3.

As illustrated in FIG. 3, the POS machine 302 located at an exit of the supermarket records information on a shopping list or shopping basket of a customer, namely, information indicating what commodities are bought by the customer.

As further illustrated in FIG. 3, the customer may show a member card 301 when checking out. The member card generally records demographic information of the card holder, for example, age, occupation, income, and other information of the card holder.

The shopping list data and demographic information may be stored and updated as a data source in a backend database 150.

A feature vector table 303 for identifying customer features is generated based on the shopping list and/or demographic information of the member. The feature vector table 303 contains feature vectors indicating features of a customer. As an example, the feature vectors <35, female, teacher, 5,000> and <milk, beer, ink> in the feature vector table 303 indicate the age, gender, occupation, income and purchased commodities of the customer C336#.

By clustering customers based on such feature vectors of customers according to a predetermined standard, the customers may be classified into different classes with their own similar shopping characteristics (for example, Class A, Class b, Class C, etc.). For example:

Class A: male, whose occupation is a security guard, a salesman, etc., with an age between 20-35, an income between 1,000-3,000, often buying sausages and beers.

Class B: female, whose occupation is a receptionist, a clerk, a teacher, etc., with an age between 25-30, an income between 3,000-5,000, often buying snack foods and yogurts.

Those skilled in the art know when specifically implementing the present invention, different standards may be set to classify customers as required. Thus, detailed description thereof may be omitted here.

At step 230, based on shopping paths of customers, one or more shopping paths adopted by more customers in each class of customers may be determined as frequent shopping path(s) of this class of customers.

After recording shopping paths of customers (step 210) and classifying the customers (step 220), a frequent shopping path for each class of customers may be determined, namely, a shopping path that is adopted by more customers in each class of customers.

This step is illustrated in FIG. 4. In FIG. 4, the shopping path of a customer as obtained at step 210 is visually indicated by symbols with arrows (for example the location sequence 140 as illustrated in FIG. 1, for example <L3, L5, L9, L11, L12>); the top left side of FIG. 4 exemplarily illustrates respective 15 shopping paths of 15 customers of Class A, as illustrated by reference number 401; the top right side exemplarily illustrates respective 15 shopping paths of 15 customers of Class B, as indicated by reference number 402. In the shopping paths of customers of Class B, 8 of them are identical. In other words, it is the shopping path adopted by more customers in the customers of Class B, which therefore may be determined as the frequent shopping path of customers of Class B, i.e., Path_B as illustrated in the right lower side of FIG. 4. Similarly, the frequency shopping paths Path_A_1 and Path_A_2 of customers of Class A may be determined.

Apparently, a frequent shopping path may represent shopping habits of customers. It should be noted that the scenario as illustrated in FIG. 4 is only exemplary. When implementing the present invention, more frequent shopping paths may be determined for each class of customers as required.

At step 240, a see-buy rate of each commodity is calculated for each class of customers. More specifically, a see-buy rate of a commodity along a shopping path is calculated for each class of customers based on the shopping lists and shopping paths of the customers.

The "see-buy rate" of a commodity refers to the probability to buy the commodity for a customer when he or she sees this commodity.

According to embodiments of the present invention, a see-buy rate of each commodity for each class of customers may be calculated with the following equation (1):

$$R_{bs}(i,k) = Nb/Ns \qquad (1)$$

Where, i denotes a commodity, k denotes a class of customers, Nb denotes the number of times that this commodity is purchased by this class of customers, and Ns denotes the number of times that this commodity is seen by this class of customers.

Here, it is assumed that as long as a commodity is located on a shelf along a shopping path by which a customer passes, this customer would see this commodity. The shopping path of a customer may be obtained, and commodities that have been bought by the customer may be acquired from the shopping list of the customer; as a definite relationship exists among a commodity, a shelf of the commodity, and the shopping path, it would be easy to derive the number of times that a commodity is purchased by a class of customers and the number of times that the commodity is seen by the class of customers.

For example, within a period of time (for example, within a week), the number of times that customers of Class A (k=A) pass through the shopping path Path_A_2 is 4,000, a shelf for bread (i=1) and a shelf for hand wash (i=2) are placed along the shopping path, while the number of times that customers of Class A purchase bread is 200, and the number of times that they purchase hand wash is 120, then $Rate_{bs}$ (1,A)=200/4000=0.05, i.e., for customers of Class A, the see-buy rate of bread is 0.05; and $Rate_{bs}$ (2, A)=120/4000=0.03, i.e., for customers of Class A, the see-buy rate of hand wash is 0.03. The number of times that customers of Class B (k=B) pass through the shopping path Path_B is 3,000, a shelf for bread (i=1) is placed along the shopping path, while the number of times that customers of Class B purchase bread is 300, then $Rate_{bs}$ (1, B)=300/3000=0.1, i.e., for customers of Class B, the see-buy rate of bread is 0.1.

It should be noted that an advantage of the present invention lies in calculating of the see-buy rate of each commodity for each class of customers. It is hard to derive this see-buy rate with a method of conventional in-site observation or camera monitoring.

At step 250, for a set of commodities, a shelf where each commodity in the set of commodities is located is determined when the total expected benefits for set of commodities are maximized during a certain period of time.

An expected benefit for a commodity refers to the expected value for the benefits from placing the commodity on a shelf. The total expected benefits refer to a sum of an expected benefit for the each commodity in a set of commodities is located in its own shelf. Generally, an expected benefit of a commodity has a positive correlation relationship with the see-buy rate, profit, sales volume, and stock of the commodity.

The expected benefit and the total expected benefit refer to an expected benefit and a total expected benefit within a certain period of time. Hereinafter, for the sake of conciseness, such time limitation to the expected benefits is omitted sometimes without affecting clarity.

When calculating the expected benefits of a commodity, this invention considers, for various classes of customers, an adjacency relationship between a shelf for the commodity and a frequency shopping path of each class of customers.

According to one embodiment of the present invention, the total expected benefits for a set of commodities include a sum of an expected benefit for the each commodity in the set of commodities based on the see-buy rate and the frequency shopping path when each commodity is located in its own shelf.

Apparently, in order to calculate total expected benefits of a set of commodities, it is necessary to calculate expected benefits of each commodity in the set of commodities when it is placed on different shelves.

In this embodiment, the expected benefits P (i, j) of the $i^{th}$ commodity when placed on the $j^{th}$ shelf are calculated with the following equation (2):

$$P(i, j) = \text{profit}(i) \cdot \sum_k [num(k, j) \cdot R_{bs}(i, k)] \qquad (2)$$

where k denotes the class of customers, $R_{bs}$ (i, k) denotes the see-buy rate of the $i^{th}$ commodity for the $k^{th}$ class of customers, and num(k,j) denotes the numbers of actual shopping paths corresponding to the frequent shopping path of the $k^{th}$ class of customers adjacent to shelf j within a certain period of time.

Equation (2) actually represents the expected benefits brought by each class of customers when the $i^{th}$ commodity is placed on the $j^{th}$ shelf.

For example, if a profit for each bag of some bread (i=1) is 1.2 (unit: RMB yuan. For simplicity, the unit of profits and benefits will be omitted hereinafter). If this bread is placed on shelf 22#, because the shelf 22# is along the frequent shopping path Path_A_2 of Class A of customers, the see-buy rate of bread for Class A of customers is $R_{bs}$ (1, A)=0.05, the number of times that Class A of customers passes by this frequent shopping path Path_A_2 within one week is 4,000 in average, then the expected benefits for placing this bread on shelf 22# for one week are:

$$P(1,22) = 1.2 * (4000 * R_{bs}(1,A)) = 1.2 * (4000 * 0.05) = 240.$$

The shelf 15# is located at the cross point between the frequent shopping path Path_A_2 of Class A of customers and the frequent shopping path Path_B of Class B of customers, the see-buy rate of bread for Class B of customers is $R_{bs}$ (1,B)=0.1, the number of times that Class B of customers passes by this frequent shopping path Path_B within a week is 3,000 in average, then the expected benefits for placing this bread on shelf 15# for one week are:

$$P(1,15) = 1.2 * (4000 * R_{bs}(1,A) + 3000 * R_{bs}(1,B)), \text{ or}$$

$$P(1,15) = 1.2 * (4000 * 0.05 + 3000 * 0.1) = 600.$$

Shelf 7# is along the frequent shopping path Path_B of Class B of customers, then the benefits for placing the bread on shelf 7# for one week is:

$$P(1,7) = 1.2 * (3000 * R_{bs}(1,B)) = 1.2 * (3000 * 0.1) = 360.$$

Suppose the unit profit for hand wash (i=2) is 4.6 RMB yuan, then the see-buy rate of the hand wash for Class A of customers is $R_{bs}$ (2, A)=0.05. The see-buy rate of hand wash for Class B of customers is $R_{bs}$ (2, B)=0.03. Then by integrating the above shelf information and frequent path information:

The expected benefits for placing the hand wash on shelf 7# for one week are:

$P(2,7)=4.6*(3000*R_{bs}(2,B))=4.6*(3000*0.03)=414.$

The expected benefits for placing the hand wash on shelf 15# for one week are:

$P(2,15)=4.6*(4000*R_{bs}(2,A)+3000*R_{bs}(2,B))=1334.$

The expected benefits for placing the hand wash on shelf 22# for one week are:

$P(2,15)=4.6*(4000*R_{bs}(2,A))=920.$

Suppose the unit profit for facial mask is 8 RMB yuan, then the see-buy rate of the facial mask for Class A of customers is $R_{bs}$ (3, A)=0.003. The see-buy rate of facial mask for Class B of customers is $R_{bs}$ (3,B)=0.02. Then by integrating the above shelf information and frequent path information, The expected benefits for placing the facial mask on shelf 7# for one week are:

$P(3,7)=8*(3000*R_{bs}(3,B))=8*(3000*0.02)=480.$

The expected benefits for placing the facial mask on shelf 15# for one week are:

$P(3,15)=8*(4000*R_{bs}(3,A)+3000*R_{bs}(3,B))=576.$

The expected benefits for placing the facial mask on shelf 22# for one week are:

$P(3,15)=8*(4000*R_{bs}(3,A))=96.$

The above examples have illustrated how to calculate the expected benefits P(i,j) for placing the $i^{th}$ commodity on the $j^{th}$ shelf.

In the above examples, only two classes of customers are taken into account for the sake of simplicity. When implementing this invention, those skilled in the art apparently may promote the above method to a scenario involving more classes of customers.

As mentioned above, according to one embodiment of the present invention, the total expected benefits for a set of commodities include a sum of an expected benefit for the each commodity in the set of commodities based on the see-buy rate and the frequency shopping path when each commodity is located in its own shelf.

Generally, suppose a set of commodities has n kinds of commodities, and m shelves are available for placing (m>=n>=1). According to the present invention, when each commodity is located on its own shelf, the sum of expected benefits of each commodity based on the see-buy rate and frequent shopping path is:

$$\sum_{i,j} P(i,j) \cdot x_{i,j} \quad (3)$$

Where, $x_{i,j} = \begin{cases} 1, & \text{for the } i^{th} \text{ commodity being placed on the } j^{th} \text{ shelf} \\ 0, & \text{for the } i^{th} \text{ commodity not being placed on the } j^{th} \text{ shelf} \end{cases}$ The constraint condition of equation (3) is: each shelf has and can only have one commodity, and each commodity can only be placed on one shelf, namely $$s.t. \begin{cases} \sum_{i=1}^{n} x_{ij} = 1, (i=1,2,\ldots,n) \\ \sum_{j=1}^{m} x_{ij} = 1, (j=1,2,\ldots,m) \\ x_{ij} \in \{0,1\}, (i=1,2,\ldots,n; j=1,2,\ldots,m) \end{cases}$$

According to the present invention, a placement scheme for placing n kinds of commodities on m shelves is determined through the following equation (4), such that the total expected benefits of the set of commodities are maximized:

$$\text{Max} \sum_{i,j} P(i,j) \cdot x_{i,j} \quad (4)$$

The equation (4) is also called an assignment model (4). All combinations of i and j that maximize the total expected benefits may be found by resolving this assignment model.

Hereinafter, how to resolve the assignment model (4) will be illustrated with an example.

Figures 5A, 5B:
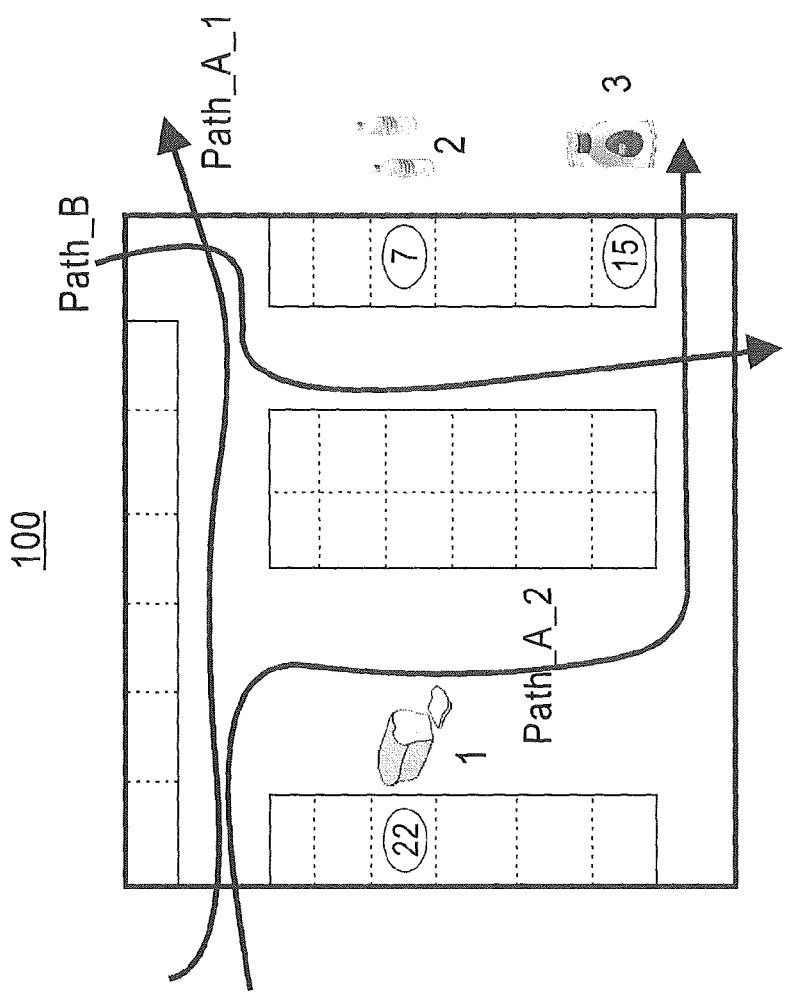
FIG. 5A schematically illustrates frequent shopping paths and shelves.
FIG. 5B schematically illustrates a commodity placement scheme that is determined according to embodiments of the present invention.

As illustrated in FIG. 5A, suppose there exist Classes A and B of customers, the frequent shopping paths of Class A of customers are Path_A_1 and Path_A_2, the number of times that Class A of customers passes by the frequent shopping path Path_A_1 per week is 200 in average, the number of times that Class A of customers passes by the frequent shopping path Path_A_2 is 4,000; the frequent shopping path corresponding Class B of customers is Path_B, and the number of times that Class B of customers passes by the frequent shopping path Path_B per week is 3,000.

Suppose it is required to place a set of commodities on shelves, and this set of commodities comprises 3 kinds of commodities: bread (i=1), hand wash (i=2), and facial mask (i=3); 3 shelves j: 7, 15, and 22 are available for placement, where shelf 7# is located along the frequent shopping path Path_B, shelf 15# is located along both frequent shopping path Path_A_2 and frequent shopping path Path_B, and shelf 22# is located along the frequent shopping path Path_A_2.

Resolving the assignment model or equation (4) comprises three steps as below.

First, calculating the expected benefits P(i,j) (i=1, 2, 3 ; j=7, 15, 22) of placing the bread, hand wash, and facial mask on shelf 7#, shelf 15#, and shelf 22#, respectively.

These expected benefits have been calculated previously, i.e., P (1, 7)=360, P (1, 15)=600, P (1, 22)=240, P (2, 7)=414, P (2, 15)=1334, P (2, 22)=920, P (3, 7)=480, P (3, 15)=576, and P (3, 22)=96, as indicated in Table 1 below:

TABLE 1

| | Expected Benefits | | |
| --- | --- | --- | --- |
| | | Shelf $j^{th}$ | |
| Commodity $i^{th}$ | 7 | 15 | 22 |
| 1 | 360 | 600 | 240 |
| 2 | 414 | 1334 | 920 |
| 3 | 480 | 576 | 96 |

Second, calculating, according to equation (3), the sum of expected benefits of each commodity based on the see-buy rate and frequent shopping path when each commodity is located on its own shelf.

Six kinds of combinations exist for the three kinds of commodities: bread (i=1), hand wash (i=2), and facial mask (i=3) and three shelves 7#, 15#, and 22#.

Combination 1: placing the bread on shelf 7#, placing the hand wash on shelf 15#, and placing the facial mask on shelf 22#, namely, $x_{1,7}=1$, $x_{2,15}=1$, $x_{3,22}=1$, $x_{1,15}=0$, $x_{1,22}=0$, $x_{2,7}=0$, $x_{2,22}=0$, $x_{3,7}=0$, $x_{3,15}=0$. Now, the expected benefits of the bread are P(1,7)=360, the expected benefits of the hand wash are P(2,15)=1334, the expected benefits of the facial mask are P(3,22)=96, then P(1,7)+P(2,15)+P(3,22)= 360+1334+96=1790.

Similarly, for other combinations of the three kinds of commodities with the three shelves, the sum of expected benefits of each commodity based on the see-buy ratios and frequent shopping paths are, respectively:

$P(1,7)+P(3,15)+P(2,22)=360+576+920=1856;$ $P(2,7)+P(1,15)+P(3,22)=414+600+96=1110;$ $P(2,7)+P(3,15)+P(1,22)=414+576+240=1230;$ $P(3,7)+P(2,15)+P(1,22)=480+1334+240=2054;$ $P(3,7)+P(1,15)+P(2,22)=480+600+920=2000.$

Third, selecting a combination scheme of commodities and shelves that maximizes the sum of expected benefits.

Among the 6 sums of expected benefits corresponding to the 6 combinations as specified above, the maximum one is P(3,7)+P(2,15)+P(1,22)=2054. At this point, $x_{1,22}=1$; $x_{2,15}=1$; $x_{3,7}=1$. In other words, the combination scheme that maximizes the expected benefits is: the shelf for bread is 22#, the shelf for hand wash is 15#, and the shelf for facial mask is 7 #. Then, this combination scheme is selected, as illustrated in FIG. 5B.

A simple example where the set of commodities only comprises three kinds of commodities has been used to illustrate the principle of resolving the assignment model (4). Apparently, those skilled in the art may resolve a corresponding assignment model (4) with a greater set of commodities by means of a computer. Actually, the prior art has proposed an algorithm for resolving the above assignment model. For example, the "Hungary algorithm," a common algorithm for resolving an assignment model as proposed by Hungarian mathematician Edmonds in 1965, may be used for resolving the assignment model (4) of the present invention.

In the above embodiment, the total expected benefits for a set of commodities include a sum of an expected benefit for the each commodity in the set of commodities based on the see-buy rate and the frequency shopping path when each commodity is located in its own shelf.

According to one embodiment of the present invention, the total expected benefits for a set of commodities further comprise associated benefits between commodities within the set of commodities.

Association exists between commodities. For example, for a certain class of customers, two (or more) commodities are often purchased together. It is seen that mutual promotion exists between commodities. Gains increased because of such mutual promotion are called associated benefits. If these commodities are placed in a frequent shopping path of this class of customers, then it will play a role of mutual promotion.

The prior art has proposed an algorithm of mining the correlation between commodities. For example, Apriori algorithm may be used to perform shopping basket analysis to each class of customers so as to find a commodity combination which are always purchased together by each class of customers. Apriori algorithm is an Algorithm for Mining Associated Rules proposed by Dr. Rakesh Agrawal and Ramakrishnan Srikant in 1994, which will not be detailed here.

In order to illustrate the embodiment, suppose it is derived through the Apriori algorithm that bread is associated with hand wash for Class A of customers, it may be further derived from empirical data that the associated benefits between bread and hand wash are 30% of the sum of their profits. For example, suppose the unit profits for the bread and hand wash are 1.2 RMB yuan and 4.6 RMB yuan, respectively, with weekly sales volumes of 1,000 pieces and 200 pieces, then the associated benefits between the bread and hand wash are (1.2*1000+4.6*200)*30%=636.

Hereinafter, $\alpha_{i,i',k}$ is used to represent the associated benefits of the $i^{th}$ commodity and $i'^{th}$ commodity for the $k^{th}$ class of customers.

According to the embodiment, the assignment model (4) is spread into the following assignment model (4a):

$$\text{Max} \sum_{i,j} P(i,j) \cdot x_{i,j} + \sum_{i,i',j,j',k} \alpha_{i,i',k} \cdot x_{i,j} \cdot x_{i',j'} \cdot \phi(j,j',k) \qquad (4a)$$

wherein, $\alpha_{i,i',k}$ is the associated benefits of the $i^{th}$ commodity and $i'^{th}$ commodity for the $k^{th}$ class of customers.

$$\phi(j,j',k) = \begin{cases} 1, & \begin{array}{l}\text{for the shelf } j^{th} \text{ and the shelf } j'^{th} \text{ being located} \\ \text{simultaneously along the frequent} \\ \text{path of the } k^{th} \text{ class of customers}\end{array} \\ 0, & \begin{array}{l}\text{for the shelf } j^{th} \text{ and the shelf } j'^{th} \text{ not being located} \\ \text{simultaneously along the frequent} \\ \text{path of the } k^{th} \text{ class of customers}\end{array} \end{cases}$$

Compared with the assignment model (4), the assignment model (4a) increases the value of associated benefits.

The manner of resolving the assignment model (4a) is similar to the above manner of resolving the assignment model (4). Hereinafter, the process of resolving the assignment model (4a) will be illustrated with an example.

Table 2 below schematically illustrates the percentages of associated benefits between every two commodities among the three commodities to the sum of profits of the every two commodities, respectively for Class A and Class B of customers.

TABLE 2

Percentages of Associated Benefits to Profits

| | Bread | Hand Wash | Facial Mask |
|---|---|---|---|
| Bread | | Class A of Customers: 30% | Class A of Customers: 0 |
| | | Class B of Customers: 0 | Class B of Customers: 10% |
| Hand Wash | Class A of Customers: 30% | | Class A of Customers: 0 |
| | Class B of Customers: 0 | | Class B of Customers: 40% |
| Facial Mask | Class A of Customers: 0 | Class A of Customers: 0 | |
| | Class B of Customers: 10% | Class B of Customers: 40% | |

For example, for Class A of customers, the associated benefits between bread and hand wash are 30% of the sum of the profits of the two.

Where P (i, j) is calculated in the same manner as above mentioned.

First, calculating the value of associated benefits $\alpha_{i,i',k}$ between every two commodities for each class of customers.

For the example as above mentioned, suppose the unit profits for bread 1, hand wash 2, and facial mask 3 are 1.2 RMB yuan, 4.6 RMB yuan, and 8 RMB yuan, respectively, and weekly sales volumes are 100 pieces, 200 pieces, and 80 pieces, respectively.

For Class A and Class B of customers, the associated benefits between every two among bread 1, hand wash 2, and facial mask 3 are calculated below, respectively.

For Class A of customers, the associated benefits between bread 1 and hand wash 2 are:

$$\alpha_{1,2,A}=(1.2*1000+4.6*200)*30\%=636.$$

While the associated benefits between every other two are 0, i.e., $\alpha_{1,3,A}=0$, $\alpha_{2,3,A}=0$.

For Class B of customers, the associated benefits between bread 1 and hand wash 3 are:

$$\alpha_{1,3,B}=(1.2*1000+8*80)*10\%=184.$$

For Class B of customers, the associated benefits between hand wash 2 and facial mask 3 are:

$$\alpha_{2,3,B}=(4.6*200+8*80)*40\%=156.$$

While the associated benefits between bread 1 and hand wash 2 are 0, i.e., $\alpha_{1,2,B}=0$.

Second, based on the shelf layout of the supermarket, the frequent shopping paths of Class A and Class B of customers, the following may be derived:

$$\phi(7,15,A)=0; \phi(7,15,B)=1; \phi(7,22,A)=0;$$

$$\phi(7,22,B)=0; \phi(15,22,A)=1; \phi(15,22,B)=0;$$

Third, calculating values of the following equations.

$$(P(1,7)+P(2,15)+P(3,22))+0=(360+1334+96)+0=1790;$$

$$(P(1,7)+P(3,15)+P(2,22))+\alpha_{1,3,B}=(360+576+920)+184=2040;$$

$$(P(2,7)+P(1,15)+P(3,22))+0=(414+600+96)+0=1110;$$

$$(P(2,7)+P(3,15)+P(1,22))+\alpha_{2,3,B}=(414+576+240)+156=1386;$$

$$(P(3,7)+P(2,15)+P(1,22))+(\alpha_{2,3,B}+\alpha_{1,2,A})=(480+1334+240)+(156+636)=2210+792=3002;$$

$$((P(3,7)+P(1,15)+P(2,22))+(\alpha_{1,3,B}+\alpha_{1,2,A})+(480+600+920)+(184+636)=2000+820=2820.$$

Fourth, selecting a combination scheme of commodities and shelves that maximizes the sum of expected benefits.

The value $P(3,7)+P(2,15)+P(1,22))+(\alpha_{2,3,B}+\alpha_{1,2,A})=3002$ is the maximum, and at this point, $x_{1,22}=1$, $x_{2,15}=1$, $x_{3,7}=1$, and then the selected combination scheme for commodities and shelves is: the shelves for bread, hand wash, and shelves for facial mask are 22#, 15#, and 7#, respectively.

A supermarket staff may place commodities on suitable shelves based on this combination scheme. Because the scheme according to the present invention considers the frequent shopping paths for various classes of customers, associated commodities may be placed on shelves along the same frequent shopping path when they cannot be placed at adjacent locations. For example, for Class A of customers, bread and hand wash are associated commodities. However, because of limitation on sector partitions for food and daily chemical products, they cannot be placed on adjacent shelves. By using the embodiments of the present invention, it is possible to place them on shelves along the same frequent shopping path, which will likewise play a role of associated promotion. For another example, for Class B of customers, facial mask and hand wash are associated commodities, and the Class B of customers has no habit of buying bread in this supermarket. By using the embodiments of the present invention, it is possible to place the hand wash on a shelf (for example, 15#) at the intersection of the frequent shopping path Path_A_2 of Class A of customers and the frequent shopping path Path_B of Class B of customers, thus the commodity placement scheme according to embodiments of the present invention may consider different classes of customers.

The method according to various embodiments of the present invention may be embodied as a computer program through programming and implemented through running the computer program by a computer system that supports supermarket. In various embodiments of the above method, for a given set of commodities, it is required to use historical information regarding sale of the commodities in the set of commodities. However, when implementing the present invention, the commodities in a set of commodities are not limited to those commodities that have been sold; if new commodities exist in the set of commodities, then the new commodities may be treated with reference to the information regarding historical sale of the commodities that belong to the same class as the new commodities.

Description has been presented above to various embodiments of the method of allocating commodity shelves in a supermarket according to the present invention. According to the same inventive concept, the present invention further provides a system for allocating commodity shelves in a supermarket.

Figure 6:
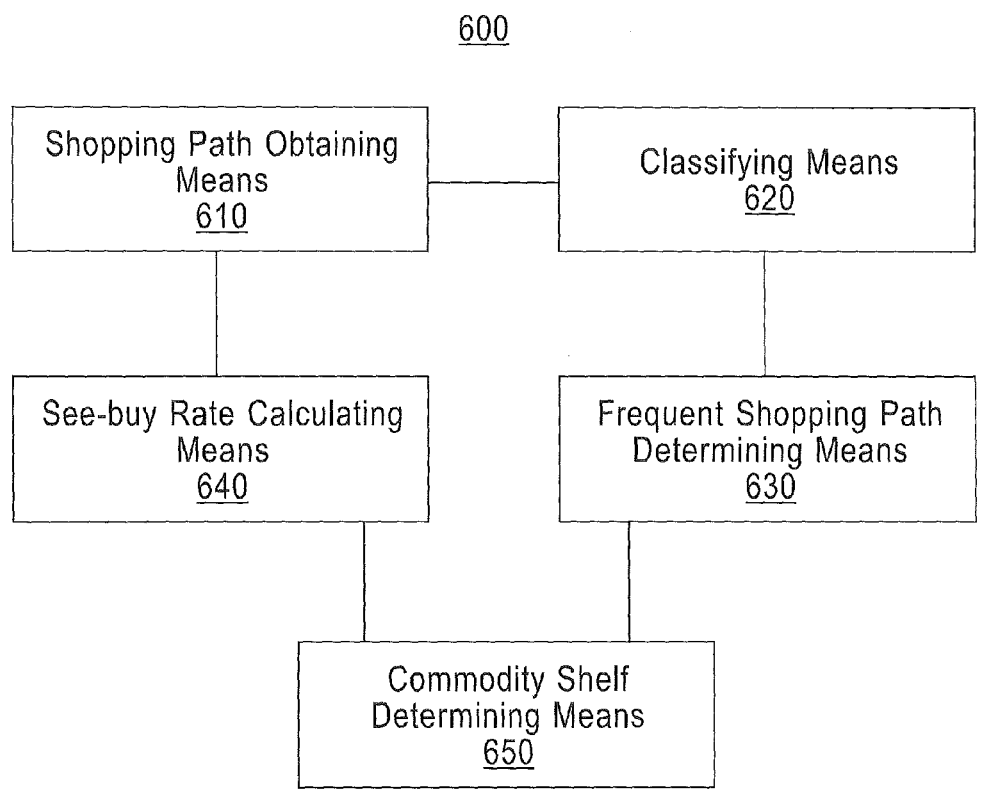
FIG. 6 schematically illustrates a block diagram of a system according to embodiments of the present invention.

As illustrated in FIG. 6, the system 600 of allocating commodity shelves in a supermarket according to embodiments of the present invention comprises:

Shopping path obtaining means 610 for obtaining shopping paths of customers in a supermarket; classifying means 620 for classifying the customers according to a predetermined standard; frequent shopping path determining means 630 for determining one or more shopping paths adopted by more customers in each class of customers as frequent shopping path(s) of this class of customers based on the shopping paths of customers; see-buy rate calculating means 640 for calculating a see-buy rate of a commodity for each class of customers based on shopping lists and the shopping paths of customers, where the see-buy rate of a commodity for a class of customers refers to a probability to purchase this commodity for this class of customers when they see this commodity, as illustrated in above equation (1); commodity shelf determining means 650, which, for a set of commodities, calculates a shelf where each commodity in the set of commodities is located when the total expected benefits for set of commodities are maximized during a certain period of time, wherein the total expected benefits include a sum of an expected benefit for the each commodity based on the see-buy rate and the frequency shopping path when the each commodity is located in its own shelf.

According to one embodiment of the present invention, the expected benefits for placing the $i^{th}$ commodity on the $j^{th}$ shelf are calculated based on the see-buy rate and the frequent shopping path according to above equation (2).

According to one embodiment of the present invention, a sum of the expected benefits for each commodity in a set of commodities is calculated according to above equation (3).

According to one embodiment of the present invention, the total expected benefits for a set of commodities further comprise a sum of associated benefits between commodities within the set of commodities.

According to one embodiment of the present invention, the sum of associated benefits between commodities within the set of commodities is $$\sum_{i,i',j,j',k} \alpha_{i,i',k} \cdot x_{i,j} \cdot x_{i',j'} \cdot \phi(j, j', k)$$

Where, $\alpha_{i,i',k}$ denotes associated benefits between the $i^{th}$ commodity and the $i^{th}$ commodity for the $k^{th}$ class of customers, and $$\phi(j, j', k) = \begin{cases} 1, & \text{for the shelf } j^{th} \text{ and the shelf } j'^{th} \text{ being located simultaneously along the frequent path of the } k^{th} \text{ class of customers} \\ 0, & \text{for the shelf } j^{th} \text{ and the shelf } j'^{th} \text{ not being located simultaneously along the frequent path of the } k^{th} \text{ class of customers} \end{cases}$$

$$x_{i,j} = \begin{cases} 1, & \text{for the } i^{th} \text{ commodity being placed on the } j^{th} \text{ shelf} \\ 0, & \text{for the } i^{th} \text{ commodity not being placed on the } j^{th} \text{ shelf} \end{cases}$$

According to one embodiment of the present invention, the system 600 comprises RFID readers 130 deployed at different locations in the supermarket, for detecting an RFID tag 125 on a shopping cart 120 used by a customer, wherein the shopping path obtaining means 610 deriving the shopping path of the customer by recording dynamic location of the cart through the RFID reader.

According to one embodiment of the present invention, wherein the classifying means 620 classifies customers based on one or more of the following data sources: shopping list recorded by a POS machine and demographic information.

Description has been presented above to a system for allocating commodity shelves in a supermarket according to embodiments of the present invention. Because the method of allocating commodity shelves in a supermarket according to the present invention has been described in detail, what is omitted in the above description of the system is the content repetitive to the description of the method of allocating commodity shelves in a supermarket or easily derived from the description of the method of allocating commodity shelves in a supermarket according to the embodiments of the present invention.

The system and the method of the present invention fully employ various technical means to allocate shelves for commodities, which not only help a supermarket to improve sales revenue, but also facilitate customers to find desired commodities quickly, which therefore have a notable technical effect.

It should be noted that the above depiction is only exemplary, not intended for limiting the present invention. In other embodiments of the present invention, this method may have more, or less, or different steps, and numbering the steps is only for making the depiction more concise and much clearer, but not for stringently limiting the sequence between each steps, while the sequence of steps may be different from the depiction. For example, in some embodiments, the above one or more optional steps may be omitted. Specific embodiment of each step may be different from the depiction. All these variations fall within the spirit and scope of the present invention.

The present invention may be implemented by hardware, software, or combination of hardware and software. The present invention may be implemented in a computer system in a collective or distributive manner, where in the distributive manner, different parts are distributed in a plurality of interconnected computer system. Any computer system or other apparatus suitable for implementing the method as depicted herein is suitable. A typical combination of hardware and software may be a universal compute system with a computer program which, when being loaded and executed, controls the computer system to implement the method of the present invention and constitute the apparatus of the present invention.

The present invention may also be embodied in the computer program product which comprises all features capable of implementing the method as depicted herein and may implement the method when loaded to the computer system.

The present invention has been specifically illustrated and explained with reference to the preferred embodiments. The skilled in the art should understand various changes thereto in form and details may be made without departing from the spirit and scope of the present invention.

What is claimed is:

1. A method of allocating commodity shelves in a supermarket, the method comprising:
   utilizing RFID tags on shopping carts and RFID readers at different locations in the supermarket, wherein said utilizing comprises:
      detecting the RFID tags on the shopping carts through the RFID readers;
      obtaining shopping paths of a plurality of customers in the supermarket based on results of said detecting the RFID tags on the shopping carts for each customer of the plurality of customers;
   classifying the plurality of customers, according to a predetermined standard, into a plurality of customer classes;
   based on the shopping paths of the plurality of customers, determining, by a processor on a computer, one or more shopping paths adopted by more customers in the plurality of customer classes as frequent shopping paths of a class of customers of the plurality of customer classes;

calculating, by the processor on the computer, a see-buy rate of a commodity for each of the plurality of customer classes based on shopping lists and the frequent shopping paths of the plurality of customers, wherein the see-buy rate of the commodity for the class of customers refers to a probability to purchase the commodity for the class of customers when the class of customers sees the commodity; and calculating a location for a set of commodities for a shelf where each commodity in the set of commodities is located when total expected benefits for the set of commodities are maximized during a certain period of time, wherein the total expected benefits include a sum of an expected benefit for each commodity in the set of commodities based on the see-buy rate and the frequent shopping paths when each commodity in the set of commodities is located in its own shelf, and wherein the sum of the expected benefits for each commodity in the set of commodities is:

$$\sum_{i,j} P(i, j) \cdot x_{i,j}$$

wherein, $$x_{i,j} = \begin{cases} 1, & \text{for the } i^{th} \text{ commodity being placed on the } j^{th} \text{ shelf} \\ 0, & \text{for the } i^{th} \text{ commodity not being placed on the } j^{th} \text{ shelf} \end{cases},$$

wherein a sum of associated benefits between a plurality of commodities in the set of commodities is:

$$\sum_{i,i',j,j',k} \alpha_{i,i',k} \cdot x_{i,j} \cdot x_{i',j'} \cdot \phi(j, j', k)$$

wherein, $\alpha_{i,i',k}$ denotes associated benefits between the $i^{th}$ commodity and the $i'^{th}$ commodity for the $k^{th}$ class of customers, and $$\phi(j, j', k) = \begin{cases} 1, & \begin{array}{l}\text{for the shelf } j^{th} \text{ and the shelf } j'^{th} \text{ being located} \\ \text{simultaneously along the frequent} \\ \text{path of the } k^{th} \text{ class of customers}\end{array} \\ 0, & \begin{array}{l}\text{for the shelf } j^{th} \text{ and the shelf } j'^{th} \text{ not being located} \\ \text{simultaneously along the frequent} \\ \text{path of the } k^{th} \text{ class of customers}\end{array} \end{cases}.$$

2. The method according to claim 1, wherein the total expected benefits of the set of commodities further comprise a sum of associated benefits between a plurality of commodities in the set of commodities.

3. The method according to claim 1, wherein said obtaining shopping paths of a plurality of customers in the supermarket comprises:
recording dynamic locations of the shopping carts, and thereby deriving each of the shopping paths of each of the customers.

4. The method according to claim 1, wherein said classifying of the plurality of customers according to the predetermined standard comprises:

classifying the plurality of customers based on one or more of the following data sources:
shopping lists recorded by point of sale (POS) machines; and
demographic information of the plurality of customers.

5. The method according to claim 1, further comprising:
detecting, by the RFID readers installed at different locations in the supermarket, different locations passed by a same shopping cart of the shopping carts.

6. A system for allocating commodity shelves in a supermarket, said system comprising:
RFID tags affixed on shopping carts used by each customer of a plurality of customers;
RFID readers affixed at different locations in the supermarket to detect the RFID tags on the shopping carts through the RFID readers;
a shopping path obtaining device, configured to obtain shopping paths of customers in the supermarket based on results of detecting the RFID tags on the shopping carts for said each customer;
a classifying device, configured to classify the customers according to a predetermined standard, into a plurality of customer classes;
a frequent shopping path determining device, configured to, based on the shopping paths of the customers, determine one or more shopping paths adopted by more customers in each class of customers of the plurality of customer classes as frequent shopping paths of a class of customers of the plurality of customer classes;
a see-buy rate calculating device, comprising a processor on a computer, configured to calculate a see-buy rate of a commodity for each class of customers based on shopping lists and the shopping paths of the customers, wherein the see-buy rate of the commodity for the class of customers refers to a probability to purchase the commodity when it is seen by the class of customers; and
a commodity shelf determining device, configured to, for a set of commodities, calculate a location for a shelf where each commodity in the set of commodities is located when total expected benefits for the set of commodities are maximized during a certain period of time,
wherein the total expected benefits include a sum of an expected benefit for each commodity of the plurality of commodities based on the see-buy rate and the frequent shopping paths when each commodity of the plurality of commodities is located in its own shelf, and
wherein a sum of associated benefits between a plurality of commodities in the set of commodities is:

$$\sum_{i,i',j,j',k} \alpha_{i,i',k} \cdot x_{i,j} \cdot x_{i',j'} \cdot \phi(j, j', k)$$

wherein, $\alpha_{i,i',k}$ denotes associated benefits between the $i^{th}$ commodity and the $i'^{th}$ commodity for the $k^{th}$ class of customers, and $$\phi(j, j', k) = \begin{cases} 1, & \begin{array}{l}\text{for the shelf } j^{th} \text{ and the shelf } j'^{th} \text{ being located} \\ \text{simultaneously along the frequent} \\ \text{path of the } k^{th} \text{ class of customers}\end{array} \\ 0, & \begin{array}{l}\text{for the shelf } j^{th} \text{ and the shelf } j'^{th} \text{ not being located} \\ \text{simultaneously along the frequent} \\ \text{path of the } k^{th} \text{ class of customers}\end{array} \end{cases}$$

-continued $$x_{i,j} = \begin{cases} 1, & \text{for the } i^{th} \text{ commodity being placed on the } j^{th} \text{ shelf} \\ 0, & \text{for the } i^{th} \text{ commodity not being placed on the } j^{th} \text{ shelf} \end{cases},$$

wherein the sum of the expected benefits for each commodity in the set of commodities is:

$$\sum_{i,j} P(i, j) \cdot x_{i,j}.$$

7. The system according to claim 6, wherein the shopping path obtaining device records dynamic locations of the shopping carts through the RFID readers, thereby deriving each of the shopping paths of each of the customers.

8. The system according to claim 6, wherein the classifying device classifies a customer of the customers based on one or more of following data sources:
- a shopping list recorded by a point of sale (POS) machine; and
- demographic information of the customer.

9. The method according to claim 5, further comprising:
obtaining a location sequence obtained by arranging said different locations passed by the same shopping cart to represent each of the shopping paths of said each customers.

* * * * *